US008199937B2

(12) United States Patent
Takai et al.

(10) Patent No.: US 8,199,937 B2
(45) Date of Patent: Jun. 12, 2012

(54) CONTENTS REPRODUCTION APPARATUS AND METHOD THEREOF

(75) Inventors: Motoyuki Takai, Tokyo (JP); Yoichiro Sako, Tokyo (JP); Toshiro Terauchi, Tokyo (JP); Makoto Inoue, Tokyo (JP); Masamichi Asukai, Kanagawa (JP); Katsuya Shirai, Kanagawa (JP); Yasushi Miyajima, Kanagawa (JP); Kenichi Makino, Kanagawa (JP)

(73) Assignee: Sony Corporation (JP)

( * ) Notice: Subject to any disclaimer, the term of this patent is extended or adjusted under 35 U.S.C. 154(b) by 1295 days.

(21) Appl. No.: 11/087,166

(22) Filed: Mar. 23, 2005

(65) Prior Publication Data

US 2005/0219055 A1    Oct. 6, 2005

(30) Foreign Application Priority Data

Apr. 5, 2004    (JP) ................. P2004-111445

(51) Int. Cl.
G09F 27/00    (2006.01)
H04R 5/02    (2006.01)
H04B 3/00    (2006.01)
H04B 7/00    (2006.01)
H04H 40/00    (2008.01)
G08B 1/08    (2006.01)

(52) U.S. Cl. ............ 381/124; 381/56; 381/77; 381/102; 381/311; 455/3.06; 455/41.2; 84/612; 340/539.11; 340/539.13; 340/539.22

(58) Field of Classification Search ............ 381/77, 381/82, 56–59, 102, 104, 107; 600/544, 600/545, 559, 26–28, 300, 59; 700/94; 455/3.06, 455/41.2, 41.3; 340/539.11–539.22, 540; 84/612, 636, 652

See application file for complete search history.

(56) References Cited

U.S. PATENT DOCUMENTS

| 3,865,001 | A |   | 2/1975 | Hershey ................... 84/1.03 |
|---|---|---|---|---|
| 6,048,310 | A | * | 4/2000 | Yasushi et al. ............. 600/300 |
| 2002/0041692 | A1 |   | 4/2002 | Seto et al. ................. 381/86 |
| 2002/0049684 | A1 | * | 4/2002 | Nagamoto et al. ............ 706/1 |
| 2002/0103598 | A1 |   | 8/2002 | Nakamoto .................. 701/207 |
| 2003/0060728 | A1 | * | 3/2003 | Mandigo .................... 600/545 |
| 2004/0092270 | A1 | * | 5/2004 | Banno ...................... 455/456.1 |
| 2006/0107822 | A1 | * | 5/2006 | Bowen ...................... 84/612 |

FOREIGN PATENT DOCUMENTS

| EP | 1241588 |   | 9/2002 |
|---|---|---|---|
| EP | 1378912 |   | 1/2004 |
| JP | 08063946 A |   | 3/1996 |
| JP | 2001-050760 A |   | 2/2001 |
| JP | 2001-195059 A |   | 7/2001 |
| JP | 2001-299980 A |   | 10/2001 |
| JP | 2002-340593 A |   | 11/2002 |
| JP | 2003085888 |   | 3/2003 |
| JP | 2003-290175 A |   | 10/2003 |
| JP | 2003333126 A | * | 11/2003 |
| JP | 2004-086189 A |   | 3/2004 |
| WO | WO 93/22762 |   | 11/1993 |

* cited by examiner

*Primary Examiner* — Devona Faulk
(74) *Attorney, Agent, or Firm* — Lerner David Littenberg Krumholz & Mentlik LLP

(57) ABSTRACT

A contents reproduction apparatus that reproduces contents suitable for a user's environment includes a position detecting unit detecting a user's position, an operation detecting unit detecting a movement of a user's body, a contents generating unit generating contents based on the user's position and the movement of the user's body, and a contents reproducing unit reproducing the generated contents.

14 Claims, 8 Drawing Sheets

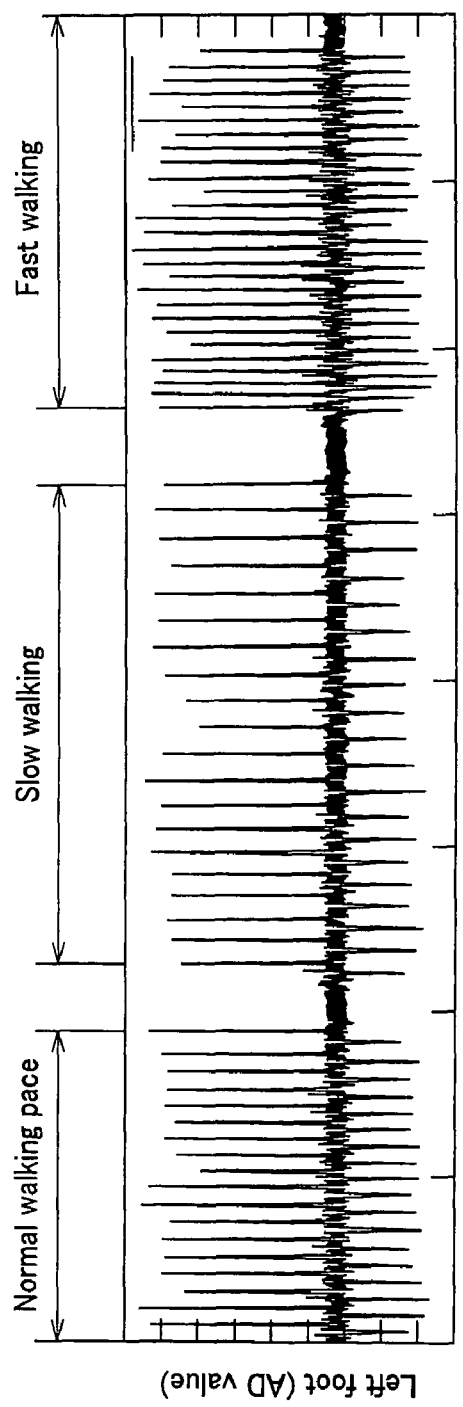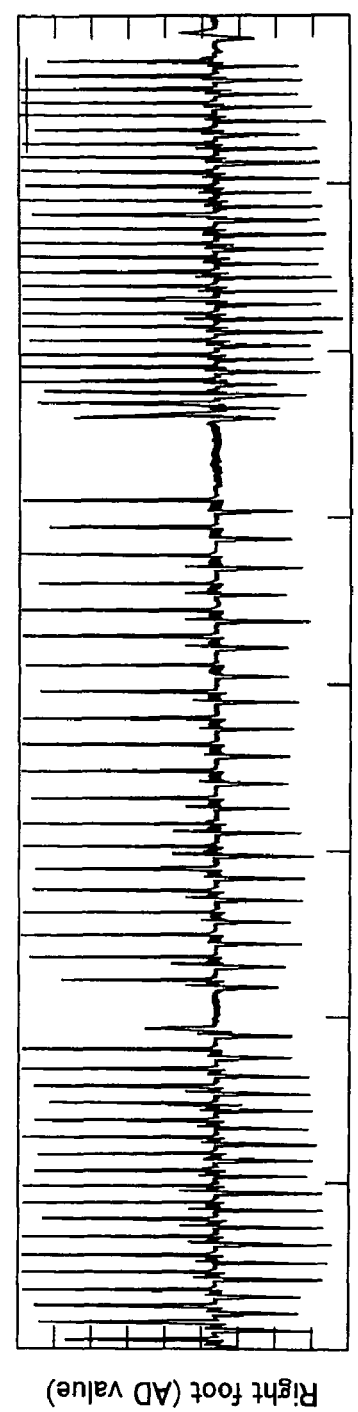
FIG.6A
FIG.6B

CONTENTS REPRODUCTION APPARATUS AND METHOD THEREOF

CROSS REFERENCE TO RELATED APPLICATIONS

The present invention contains subject matter related to Japanese Patent Application JP 2004-111445 filed in the Japanese Patent Office on Apr. 5, 2004, the entire contents of which being incorporated herein by reference.

BACKGROUND OF THE INVENTION

1. Field of the Invention

The present invention relates to a contents reproduction apparatus and a method for reproducing contents.

2. Description of Related Art

A portable music reproducer has come into wide use, with use of such a portable music reproduce, a user can enjoy a music while moving, for example, when the user is in transit by train, moving, moving on foot, or jogging around. There exists a portable music reproducer which reproduces music contents stored in a recording medium, such as an MD (minidisc; Registered Trademark), a CD (Compact Disc), etc., or incorporates an HD (Hard Disc) storing music contents, a semiconductor memory and the like.

Incidentally, a reproducing environment of a music of a portable type music reproducer changes in accordance with a place and time in which the user moves. In addition, a user's mood always changes. The music suitable for the user also changes in response to this.

As described above, the music reproducer reproduces the music contents recorded in a recording medium or a recorder intact. However, when already recorded music contents are merely continuously reproduced in a recorded order, the music suitable for a place and time in which the user exists, and the user's mood cannot be reproduced. Therefore, in order that the user may obtain a sense of unity with the music, there exists a music reproducer in which a user's waling pace, (walking pace/running pace simply called "pace" is detected, and the user's walking pace is synchronized with a tempo (rate of speed of the beat of music) of the music reproduced (refer to, for example, Jpn. Pat. Appln. Laid-Open Publication No. 2003-85888).

Nevertheless, by merely synchronizing the tempo of the music reproduced with the user's walking pace does not provide the music suitable for a user's environment, such as a place and time where the user exists. This applies to not only the music contents but also videos and other kind of information.

SUMMARY OF THE INVENTION

The present invention has been made in view of the above-mentioned subject, and it is desirable to provide contents reproduction apparatus and a method thereof which reproduces contents suitable for a user's environment.

In order to achieve the above-mentioned object, a contents reproduction apparatus according to the present invention detects a user's position in a position detecting means, and detects a movement of a user body in an operation detecting means. A contents generating means generates contents suitable for the user based on the user's position and the user's movement. The generated contents are reproduced for the user by contents reproducing means.

Further, in a method for reproducing contents according to the present invention, a position detecting step detects the user's position, and an operation detecting step detects the movement of the user's body. A contents generating step generates the contents suitable for the user based on the user's position and the movement of the user's body, and a contents reproducing step reproduces the generated contents for the user.

According to the present invention, since the contents are generated based on the user's position and the movement of the user's body, when the user moves, such as he or she goes for a walking, jogging, etc., the contents change in response to a user's walking speed and circumferential environment, and the contents suitable for the user can be reproduced. Further, since the contents are changed in response to the user's movement and operation, the user feels a sense of unity with the contents, thereby improving entertainment properties.

These objects and other objects, features and advantages of the present invention will become more apparent from the following detailed description of the preferred embodiments of the present invention when taken in conjunction with accompanying drawings.

BRIEF DESCRIPTION OF THE DRAWINGS

FIGS. 6A and 6B are views each showing an output example of the general purpose foil strain gage;

DETAILED DESCRIPTION OF THE PREFERRED EMBODIMENTS

The present invention is applied to a portable contents reproduction apparatus, such as music reproducer, a video reproducer, a portable telephone, a PDA, a laptop computer, a wearable computer. The present invention has features to generate contents reproduced for a user who moves around while carrying the contents reproduction apparatus in response to the movement of the user and a user's position, or to change the contents reproduced for the user.

Figure 1:
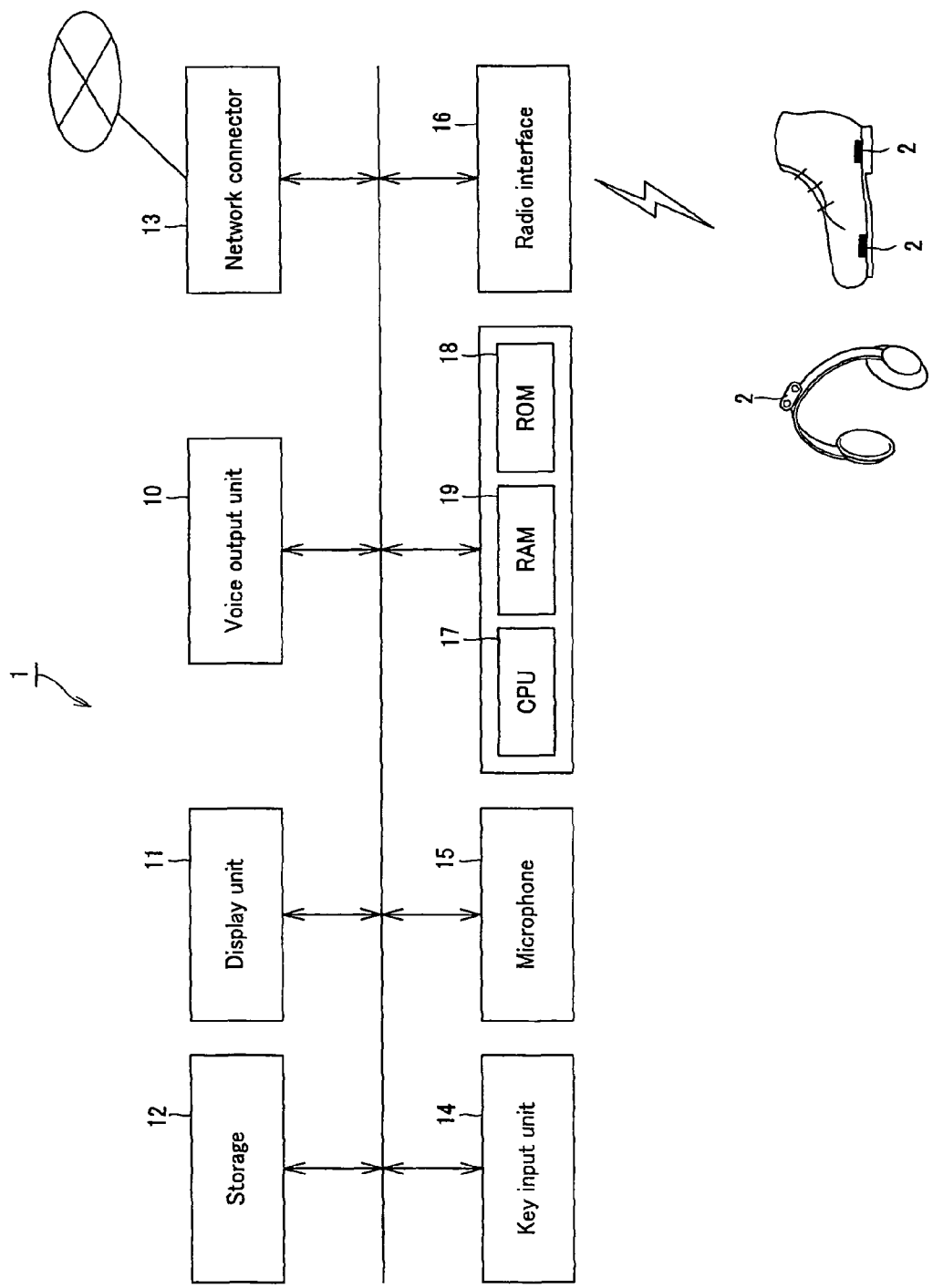
FIG. 1 is a block diagram showing a constitution of a contents reproducer.

Referring to FIG. 1, the present invention will be described with respect to an example applied to a contents reproducer 1. The contents reproducer 1 is an apparatus for reproducing voice contents and video contents. The contents reproducer 1 includes a voice output unit 10 for outputting a voice, and a display unit 11 for outputting an image. The voice contents and the video contents are stored in a storage 12. As the storage 12, there are an HD (Hard Disc), an optical disc, a semiconductor memory, etc. The voice contents and the video contents can be downloaded through a network connector 13 via the Internet.

The contents reproducer 1 includes a key input unit 14, and a microphone 15. The key input unit 14 accepts inputting of a command, such as "reproducing", "stop", "temporary stop", "selection of music", etc. A radio interface 16 performs a radio communication with a walking sensor 2 and a GPS unit 3 to be described later, and receives walking data and position data.

A CPU (Central Processing Unit) 17 controls the contents reproducer 1. A program and setting information necessary to control the contents reproducer 1 are stored in a ROM (Read Only Memory) 18 and the storage 12. The CPU 17 forms and processes the contents in accordance with an analysis of user's walking operation, an analysis of user's environment and the contents in response to the user's environment, as a RAM (Random Access Memory) 19 for work area.

Figure 2:
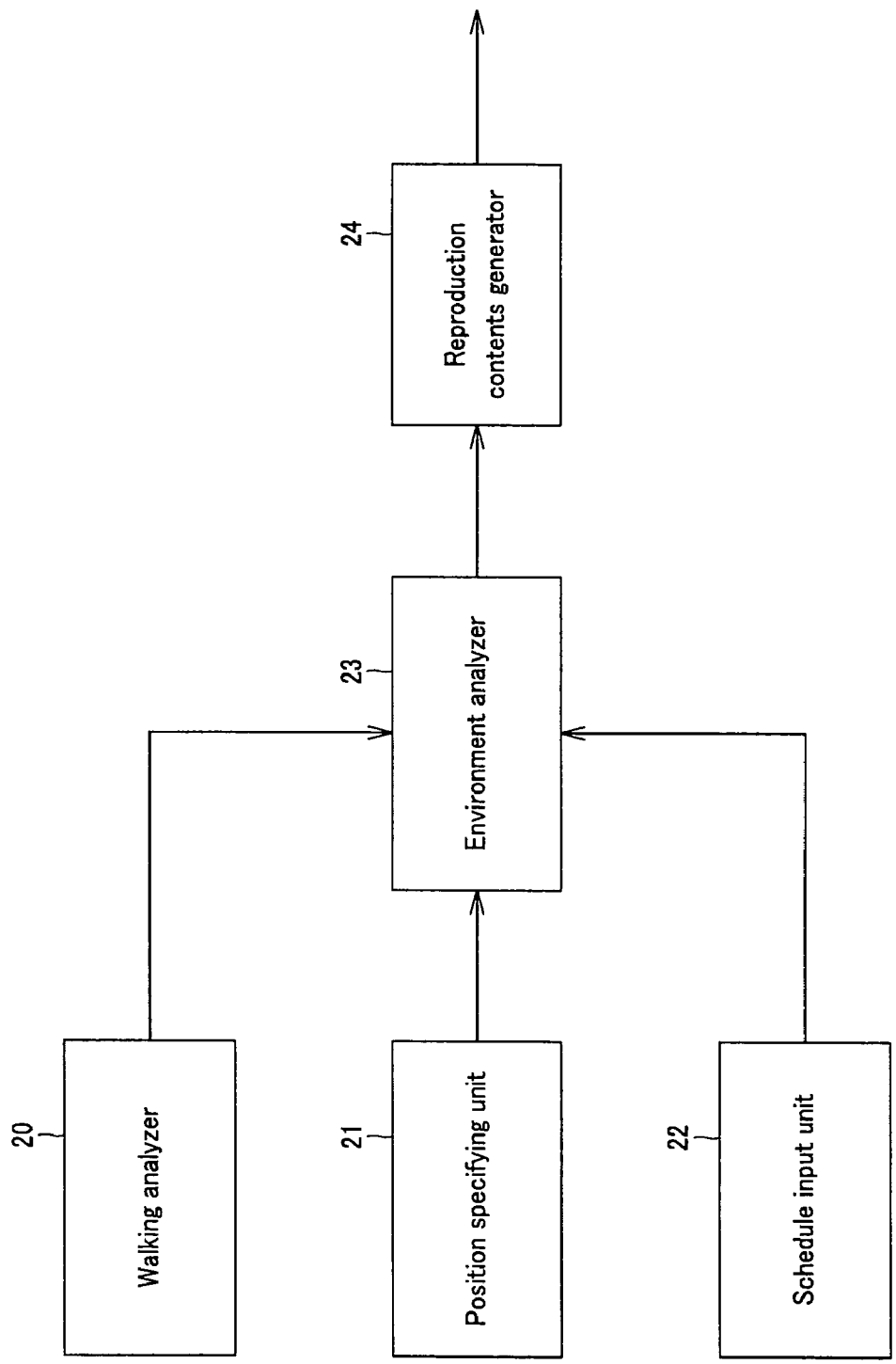
FIG. 2 is a block diagram showing a software configuration of the contents reproducer.

FIG. 2 shows a software configuration of the contents reproducer 1. The contents reproducer 1 includes a walking analyzer 20 for analyzing a user's walking operation based on an output of the walking sensor 2, a position specifying unit 21 for specifying the place where the user exists based on the output of the GPS unit 3 and map data, a schedule input unit 22 for receiving the input of the user's schedule, an environment analyzer 23 for analyzing the user's environment based on the user's walking operation, the user's position and the user's schedule, and a reproduction contents generator 24 for generating the contents in response to the user's environment and processing the contents in response to the user's environment.

The walking analyzer 20 analyzes the user's walking operation based on walking data outputted from the walking sensor 2. As a specific example of the walking sensor 2, there are an acceleration sensor 4 for detecting the user's vertical movement and a general-purpose foil strain gage 5 for detecting the user's foot step.

Figure 3:
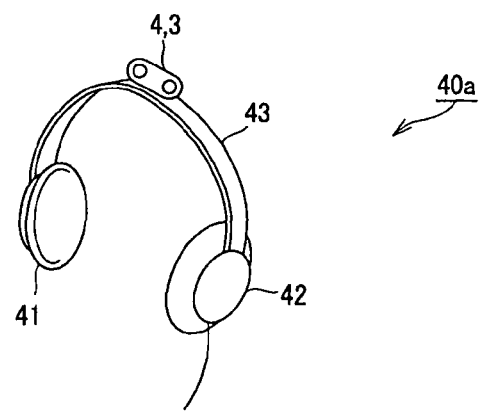
FIG. 3 is a view showing mounting positions of an acceleration sensor and a GPS unit.
Figure 3:
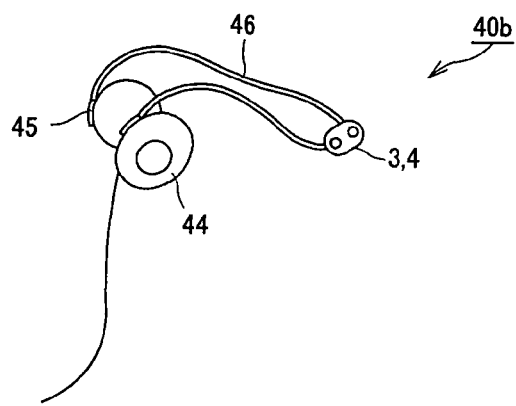
Figure 3:
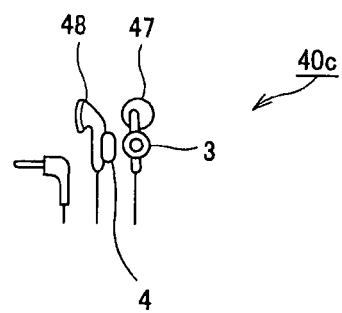

The acceleration sensor 4 is mounted at a headphone 40 of the contents reproducer 1. The headphone 40 is one of the voice output unit 10 shown in FIG. 1. FIG. 3 shows a mounting example of the acceleration sensor 4. In a head top headphone 40a of the headphone of the type in which a connector 43 for connecting left and right speakers 41 and 42 is wrapped on a head top part of the user, the acceleration sensor 4 is mounted at a center of the connector 43, that is, the upper part of the user's head top part. In a neck band type headphone 40b of the headphone of the type in which a connector 46 for connecting left and right speakers 44 and 45 is wrapped on a rear head part of the user, the acceleration sensor 4 is mounted at a center of the connector 46, that is, at the backside of the user's rear head part. In an inner ear type headphone 40c of the headphone of the type in which the speakers are inserted into user's ear holes, each acceleration sensor 4 is mounted at left and right speakers 47 and 48.

Figure 4:
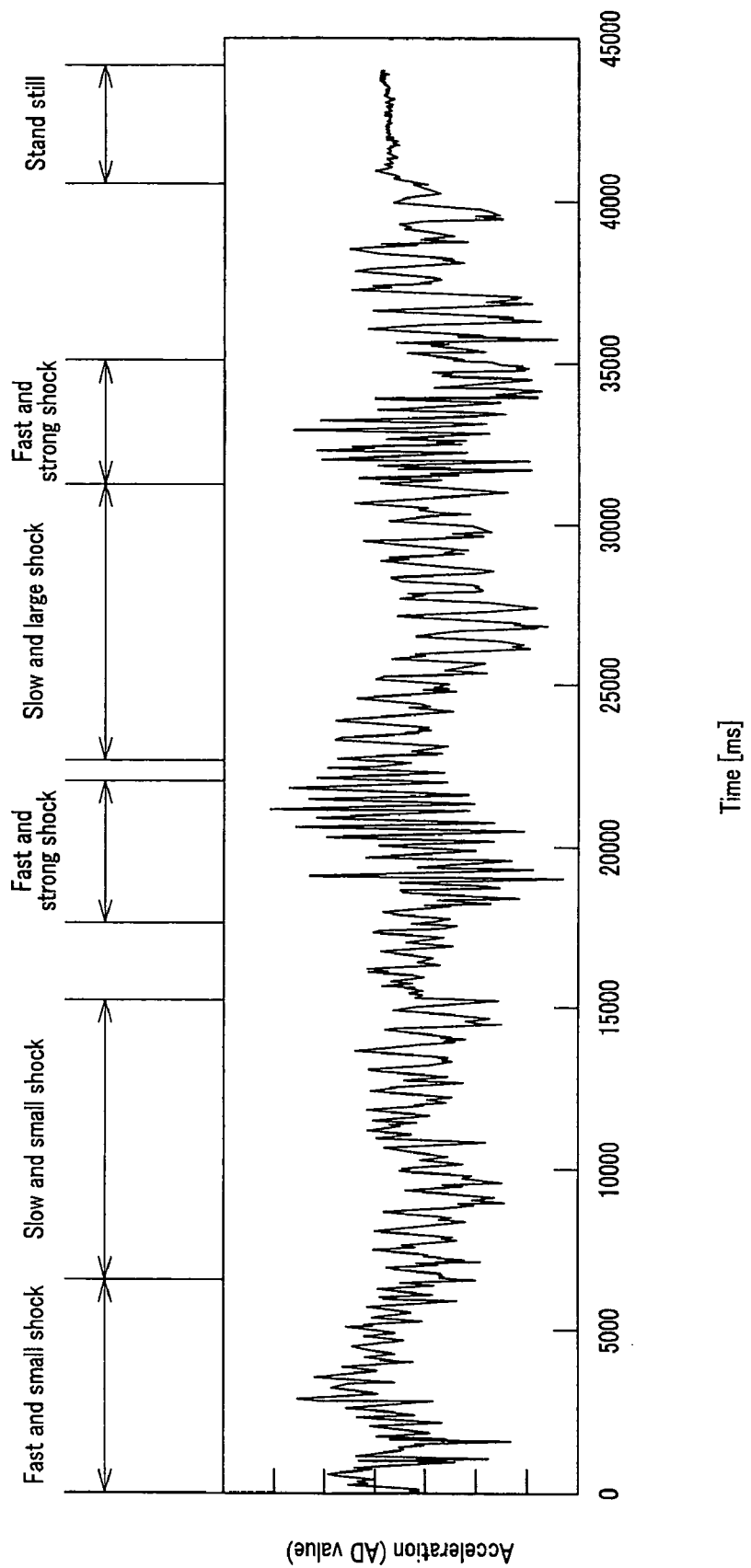
FIG. 4 is a view showing an output example of the acceleration sensor.

The acceleration sensor 4 detects a vibration of a vertical axis. FIG. 4 shows an output example of the acceleration sensor 4 during walking. In FIG. 4, time is plotted on an abscissa axis, and a value of an acceleration is plotted on an ordinate axis. In FIG. 4, after the start of a measurement "fast and small vibration" is detected during the time interval from 0 to 6 seconds "slow and small vibration" is detected during the time interval from 6 to 15 seconds, "fast and strong vibration" is detected during the time interval from 18 to 22 seconds, "slow and large vibration" is detected during the time interval from 23 to 32 seconds, and "fast and strong vibration" is detected during the time interval from 32 to 34 seconds.

The walking operation analyzer analyzes a user walking operation based on a period and vibrating width of the vibration. For example, "fast and small vibration" is judged as walking with short and quick steps, "slow and small vibration" is judged as walking with big and slow steps, "fast and strong shock" is judged as running with short steps, "slow and large shock" is judged as skip, and "fast and strong shock" is judged as running at full speed. In addition, when the vibration is not detected, the walking analyzer judges a stationary state.

The GPS unit 3 is attached to the headphone 40. When the GPS unit 3 is attached to the top of the head, an interruption of a radio wave is less frequent and an accuracy is improved. Incidentally, this GPS unit 3 receives, in addition to the radio wave outputted from a satellite, a radio wave radiated from a radio communication network, a satellite communication network for a portable telephone as position information.

Incidentally, the mounting positions of the GPS unit 3 and the acceleration sensor 4 may be a head-mounted display, a wrist watch, a shoe, a clothing, an accessory and the like.

Figure 5:
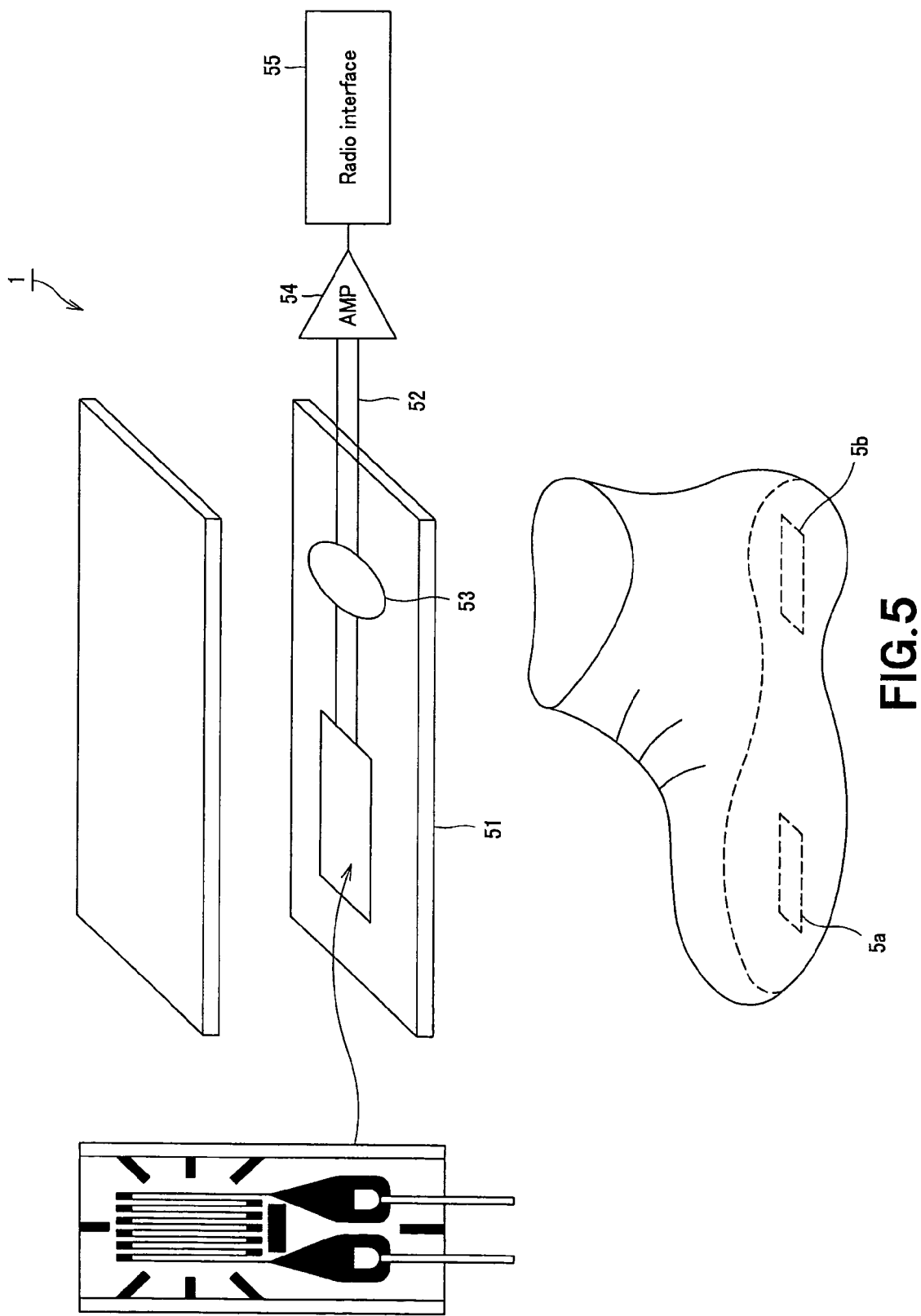
FIG. 5 is a view showing a constitution and a mounting position of a general purpose foil strain gage.

FIG. 5 shows a general-purpose foil strain gage 5 as a specific example of the walking sensor 2. The general-purpose foil strain gage 5 converts the force in the bending direction into an electric signal. The positive or negative of the electric signal corresponds to the bending direction. The walking sensor 2 is mounted so as to output the positive electric signal when the foot is stepped down, and to output the negative electric signal when the foot is separated from the ground. The general-purpose foil strain gage 5 is laminated on a phosphor bronze plate 51. An output terminal 52 of the general-purpose foil strain gage 5 is reinforced by a reinforcing material 53, and extended outside of the phosphor bronze plate 51. The output terminal 52 of the general-purpose foil strain gage 5 is connected to an amplifier 54. The amplifier 54 is connected to a radio interface 55. The radio interface 55 transmits user's walking data to the contents reproducer 1.

FIGS. 6A and 6B show an output example of the general-purpose foil strain gage 5. In this example, an output of the general-purpose foil strain gage 5 when a user walks at a normal walking tempo, an output when the user walks at a slow walking tempo, and an output when the user walks at a fast walking tempo, are displayed. The output of the general-purpose foil strain gage 5 becomes maximum at a moment that user's foot is grounded, and becomes minimum at a moment that the user's foot is separated from the ground. The general purpose foil strain gages 5 may be respectively provided at left and right feet, or may be provided only at one foot, and may be utilized at ½ of a grounding interval as a walking tempo. FIG. 6A shows an output of the general-purpose foil strain gage 5 attached to the sole of the left foot, and FIG. 6B shows an output of the general-purpose foil strain gage 5 attached to the sole of the right foot. The user's walking tempo is a time interval from when the one foot is grounded until the other foot is grounded, that is, the time interval from when the value of the general purpose foil strain gage 5 of one foot becomes maximum to when the value of the general purpose foil strain gage 5 of the other foot becomes maximum.

Incidentally, the walking data can be detected by the acceleration sensor attached to an arm or a wrist, and a direction indicator attached to a part of the user's body. The acceleration sensor attached to the arm or the wrist can detect the shock of a hand synchronized with stepping down of a foot, and the direction indicator can detect the moving direction of the user.

The position specifying unit 21 reads, when the user's position information is inputted from the GPS unit 3, map information recorded in the storage 12, compares the position information with the map information, and specifies the place where the user exists.

The schedule input unit 22 receives an input of the user's schedule. The schedule input unit 22 can input the schedule of the contents, such as which song the user reproduces while what kind of things he or she is doing, and which song the user reproduces, while what king of mood he or she is in addition to the schedule written in an ordinary schedule book, data and hour, place, and what kind of things the user is planning to do.

The schedule of the music is recorded in association with a place, time, day of the week, mood, and so forth. As one example of the music schedule, a jogging course and the schedule of the song played during jogging will be described. In this schedule, the jogging course, a place (building, signpost) to be a trigger for changing the music, and the songs to be reproduced during jogging can be specified. In this schedule, it is set to repeatedly reproduce the same song between a certain point and next point. Even if the same song is repeatedly reproduced, a melody is changed in accordance with the user's walking tempo, and hence the user never get tired.

In addition to the song to be reproduced, the contents of which element of the music is changed, can be inputted as the schedule. Input items include a tempo, melody, musical interval, tone, strength. Thus, the user can select a change of only a tempo, a change of only a musical interval, a change of only a melody, a change of contents and so on, thereby extending the degree of freedoms of selecting.

The inputted schedule is updated through learning. If the stop of the reproduced song, change of the melody, change of the program of the song reproduced, etc., are instructed by the user, this instruction can be used as learning data, and when the music is reproduced in the same environment, the leaning data becomes a judging material in the case of selecting and changing the music.

The environment analyzer. 23 analyzes the user's circumferential environment and a user's psychological state from a user's position specified by the position specifying unit 21, the user's schedule inputted to the schedule input unit 22, and the user's walking operation analyzed by the walking analyzer 20. For example, a schedule for arranged meeting at an entrance of a department store at 6 o'clock is recorded. When it is 5:50 by the watch, the user locates around the department store, and a user's walking operation is trot, the environment analyzer 23 judges that the user is directed urgently to a meeting place based on these contents.

The reproduction contents generator 24 generates the contents suitable for the analyzed result of the environment analyzer 23 and processes the contents. As in the above-mentioned example, as a result of the analysis, when it is judged that the user is in a hurry, in order to raise the user's walking pace, the generator 24 makes the rhythm of the music faster, or selects a music having a fast beat. In the case that the music contents are MIDI (Music Instruments Digital Interface), control of the tempo and melody of the music can be facilitated. Further, the reproduction contents generator 24 forms useful contents, such as a required time getting to the arranged meeting place, a present time, etc. and reproduces the contents.

Figure 7:
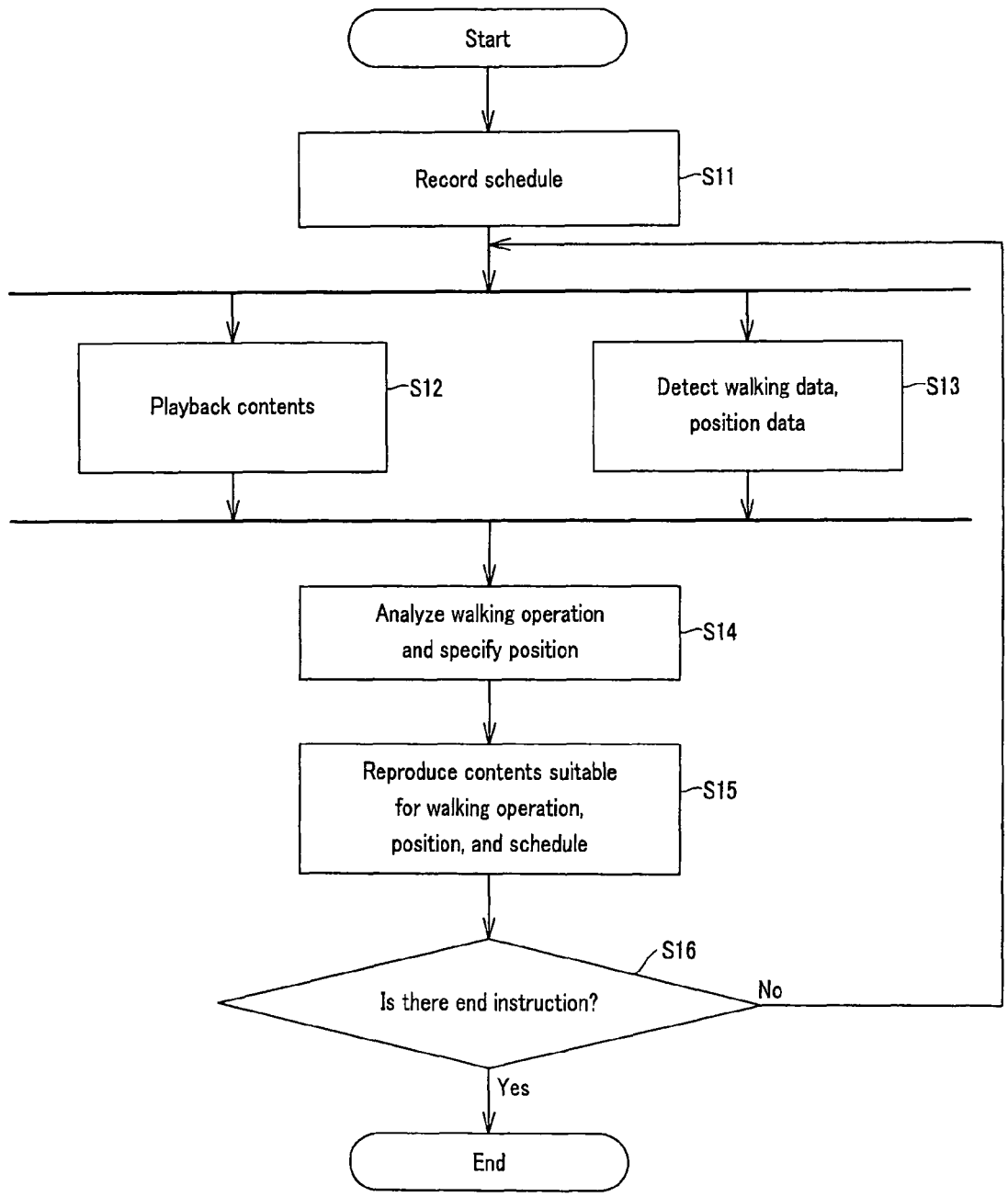
FIG. 7 is a flowchart showing an operation of the contents reproducer.

An operation of the contents reproducer 1 will be described with reference to the flowchart of FIG. 7. The operation of the contents reproducer 1 is started from inputting of a user's schedule. The schedule input unit 22 records the input from the user in the storage 12 (step S11). The user starts moving by carrying the contents reproducer 1. The contents reproducer 1 reproduces the music contents and the video contents while the user is moving (step S12).

The contents reproducer 1 detects the walking data by the walking sensor 2 and detects the position data by the GPS unit 3 (step S13). The walking analyzer 20 analyzes the user walking operation based on the walking data. The position specifying unit 21 specifies the user's position based on the output of the GPS unit 3 (step S14).

The environment analyzer 23 analyzes the user psychological state and user's circumferential environment based on the user's walking operation, the user's location, and the user's schedule, and outputs the analyzed result to the reproduction contents generator 24. The reproduction contents generator 24 reproduces to the user by changing the melody or rhythm of the contents reproduced at present to meet the user's psychological state and circumferential environment, or generating appropriate information. The contents reproduced for the user may be character data or image data. The reproduction contents generator 24 may reproduce the contents for the user by way of a vibrating function, or by flashing and/or lighting an LED (Light-Emitting Diode) (step S15).

The contents reproducer 1 transfers to a process in step S12 when the user does not designate stopping of operation (NO in step S16). The contents reproduced by the contents reproducer 1 are dynamically changed by this process. Meanwhile, when the user designates to stop the operation (YES in step S16), the contents reproducer 1 completes the process.

Figure 8:
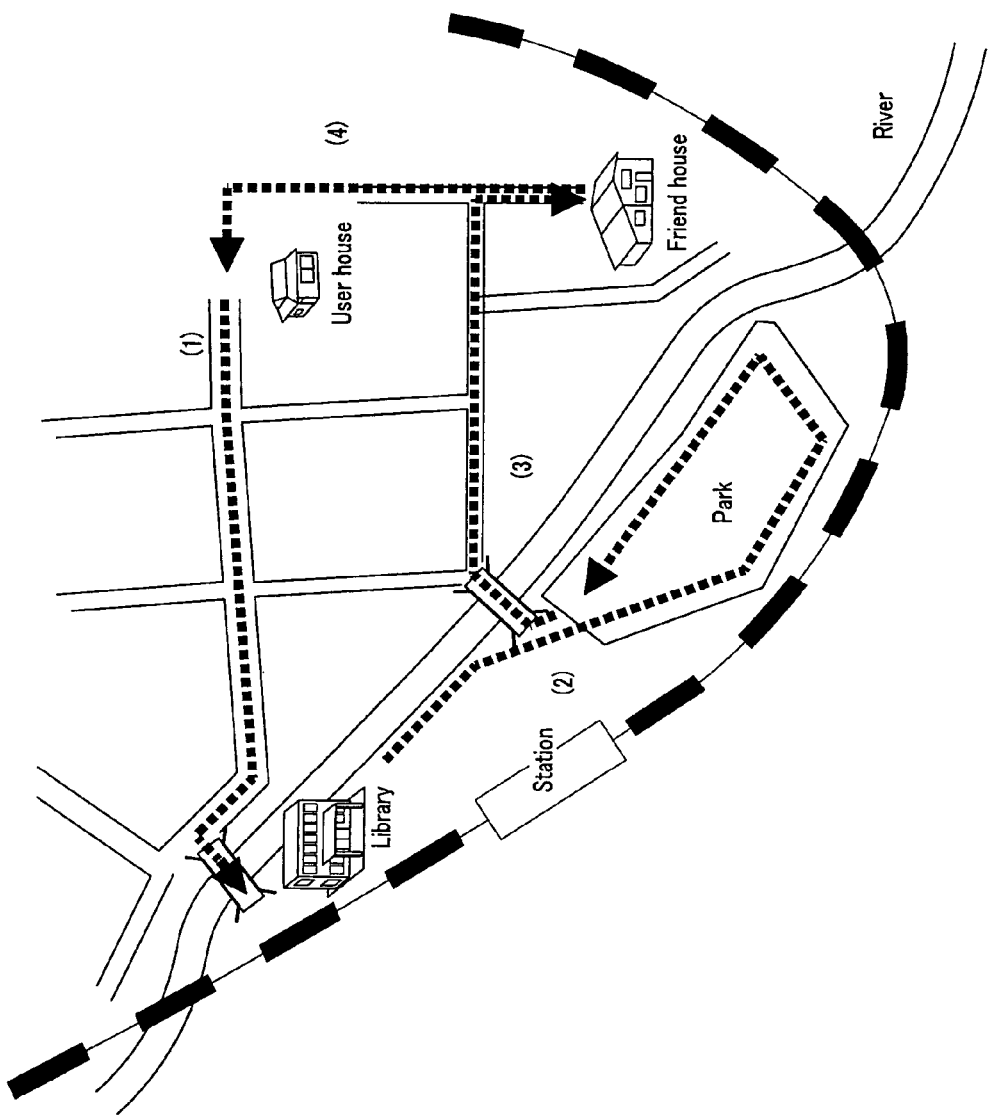
FIG. 8 is a view showing a user's moving route.

The above-mentioned operation will further be concretely described. In this example, a schedule the user stops at a library and a friend's house, and must return home until a certain time, is recorded. The user, as shown in FIG. 8, stops at the library, then goes to the friend's house. However, there is a park on the way from the library to the friend's house, and the user stops by the park on the way to the friend's house. The user wears an earphone of the contents reproducer 1 in his or her ear and listens a music while the user moves along the above-mentioned route.

First, the operation of the contents reproducer 1 in a section in which the user starts his or her own house, that is a departure spot, and goes toward the library will be described. The contents reproducer 1 detects the pace and direction of the user while the user moves to the library. A flat road continues from the user's house to the library, and there is no particularly outstanding building or scenery. Therefore, the user's pace is monotonous. The environment analyzer 23 judges that the user is a normal state. The reproduction contents generator 24 performs normal continuous reproduction without changing the music listening by the user in accordance with the judgment of the environment analyzer 23. When the position specifying unit 21 detects that the user arrives at the library, the reproduction contents generator 24 fades out the volume of the music contents.

The reproduction contents generator stops reproducing of the music contents while the user exists in the library. When the position specifying unit 21 detects that the user leaves the library, the reproduction contents generator 24 fades in the volume of the music contents, and reproduces the music by an original volume. Incidentally, when the user carries a book to be returned to the library, a message of prompting the user to return the book is displayed on a display unit 11. Contrarily, when there is a necessary book, a title of the book, related keyword and the like are displayed on the display unit 11. Such an alarm message is previously inputted to the schedule by the user.

When the user leaves the library and walks toward a park, the position specifying unit 21 detects that the user starts walking a road along a river, and the walking analyzer 20 detects that the user's walking tempo is lowered. The environment analyzer 23 judges that the user walks slowly with good mood from the detected result. The reproduction contents generator 24 slows the music tempo to keep pace with the walking tempo according to the analyzed result of the environment analyzer 23, and selects the song that matches to the user's walking tempo. Contrarily to the above, when the user moves the road along the river at a trot, the song having a fast tempo is selected to keep pace with the user's walking operation, or increases the tempo of the song being reproduced.

As the user arrives at the park and thus the walking operation is stopped, the environment analyzer 23 judges that the user takes a rest in the part. The reproduction contents generator 24 reproduces the music suitable for a rest in the park, for example, a healing music, etc. Further, when the user takes a rest, a video, television program, e-mail, weather forecast and the like may be displayed on the display unit 11.

The road from the park to the friend's house is an easy road surrounded by greenery. When the user's walking tempo becomes fast irrespective of such a road, the environment analyzer 23 judges that the user makes haste. According to the analyzed result, the reproduction contents generator 24 reproduces a song for fastening user's walking pace, an up-tempo song, or accelerates the tempo of the music being reproduced. When there is a place where the volume of traffic is heavy in the user's moving direction, an alarm of "watch out for vehicle", etc. may be displayed on the display unit 11, or an alert sound is inserted to the song being reproduced.

When the user arrives at the friend's house, the reproduction contents generator 24 fades out the music being reproduced. The music stops while the user stays in the friend's house. The reproduction contents generator 24 fades in the stopped music when the user leaves the friend's house, and reproduces the music in a state before stopping.

When the user leaves the friend's house, the user finishes the schedule of the day. The environment analyzer 23 analyzes that the user completes the schedule and leaves for home. The reproduction contents generator 24 selects and reproduces the music suitable for the end of a day finish in accordance with the analyzed result of the environment analyzer 23. Further, when a returning home time is appointed, the alert sound is inserted or the music having a fast tempo is elected so as to be in time for the returning home time.

As described above, the contents reproducer 1 applied with the present invention reproduces the contents suitable for the user's walking operation and the user's position, to the user. The contents change in accordance with the user's walking operation and the user's position. Therefore, the entertainment properties of the music reproduced to the user can be improved while the user is out, such as, jogging, walking, etc.

Since the contents to be reproduced are changed in accordance with the user's mood and schedule, the contents that make the user comfortable or the contents that make the user act in accordance with his or her schedule can be reproduced.

It should be understood by those skilled in the art that various modifications, combinations, sub-combinations and alterations may occur depending on design requirements and other factors insofar as they are within the scope of the appended claims or the equivalents thereof.

What is claimed is:

1. A portable contents reproduction apparatus comprising:
   position detecting means to be carried by a user for detecting a current geographical place or position of the user;
   operation detecting means to be carried by the user for detecting a movement of the user;
   walking analyzer means for determining a type of walking operation of the user from among a plurality of types of walking operations based on the detected movement of the user;
   schedule input means for receiving an input of a schedule of the user;
   contents generating means to be carried by the user for generating contents based on (i) the detected current geographical place or position of the user from the position detecting means and (ii) the type of walking operation of the user determined by the walking specifying means and (iii) the schedule of the user;
   a contents reproducing device to be carried by the user for reproducing the contents.

2. The contents reproduction apparatus according to claim 1, wherein the operation detecting means detects at least one of a vertical movement of a body trunk and head of the user, a grounding of a foot of the user, or a direction of the user.

3. The contents reproduction apparatus according to claim 1, wherein the contents generating means changes at least one of a tempo, melody, musical interval, tone, dynamics, or sound volume, of music contents.

4. The contents reproduction apparatus according to claim 3, wherein the music contents are stored in at least one of an optical disc, hard disc, or semiconductor memory.

5. The contents reproduction apparatus according to claim 1, wherein the position detecting means detects the current geographical place or position of the user based on a radio wave received from at least one of a GPS (Global Positioning System), a radio communication network, or a satellite communication network for a portable telephone.

6. A method for reproducing contents from a portable contents reproduction apparatus, comprising:
   a position detecting step of detecting a user's current geographical place or position by use of a position detecting device to be carried by the user;
   an operation detecting step of detecting a movement of the user's body by use of an operation detecting device;
   a walking analyzing step of determining a type of walking operation of the user from among a plurality of types of walking operations based on the detected movement of the user's body;
   a schedule inputting step of receiving an input of a schedule of the user;
   a contents generating step of generating contents based on (i) the user's detected current geographical place or position from the position detecting step and (ii) the type of walking operation of the user determined by the walking analyzing step and (iii) and the schedule of the user, and
   a contents reproducing step of reproducing the contents generated by the contents generating step to the user by use of a contents reproducing unit.

7. A portable contents reproduction apparatus comprising:
   a position detecting unit to be carried by a user and to detect a current geographical place or position of the user;
   an operation detecting unit to be carried by the user and to detect a movement of the user;
   a walking analyzer unit to determine a type of walking operation of the user from among a plurality of types of walking operations based on the detected movement of the user;
   schedule input unit for receiving an input of a schedule of the user;
   a contents generating unit to be carried by the user and to generate contents based on (i) the detected current geographical place or position of the user from the position detecting unit and (ii) the type of walking operation of the user determined by the walking analyzer unit and (iii) the schedule of the user;
   and a contents reproducing unit to be carried by the user and to reproduce the contents generated by the contents generating unit.

8. The contents reproduction apparatus according to claim 1, further comprising a storage device to store music contents, and in which the contents generating means selects a music content from among the music contents stored in the storage device based on the detected current geographical place or position of the user from the position detecting means and the type of walking operation of the user determined by the walking specifying means.

9. The contents reproduction apparatus according to claim 7, further comprising a storage device to store music contents, and in which the contents generating unit selects a music content from among the music contents stored in the storage device based on the detected current geographical place or position of the user from the position detecting means and the type of walking operation of the user determined by the walking specifying means.

10. The contents reproduction apparatus according to claim 1, in which the plurality of types of walking operations include two or more of (i) short and quick steps, (ii) big and slow steps, (iii) skipping, (iv) running with short steps, and (v) running at full speed.

11. The method according to claim 6, in which the plurality of types of walking operations include two or more of (i) short and quick steps, (ii) big and slow steps, (iii) skipping, (iv) running with short steps, and (v) running at full speed.

12. The contents reproduction apparatus according to claim 7, in which the plurality of types of walking operations include two or more of (i) short and quick steps, (ii) big and slow steps, (iii) skipping, (iv) running with short steps, and (v) running at full speed.

13. The contents reproduction apparatus according to claim 1, wherein the schedule of the user includes an element of the contents which is changeable by the user, said element being one of a tempo, melody, musical interval, tone, or strength of the contents.

14. The contents reproduction apparatus according to claim 7, in which the walking analyzer unit includes a strain gage connectable to a shoe of the user.

* * * * *